US007763560B2

(12) United States Patent
Horiuchi et al.

(10) Patent No.: US 7,763,560 B2
(45) Date of Patent: Jul. 27, 2010

(54) CATALYST FOR PURIFYING DIESEL ENGINE EXHAUST GAS AND METHOD FOR PRODUCTION THEREOF

(75) Inventors: Makoto Horiuchi, Himeji (JP); Masao Hori, Himeji (JP); Tatsuya Yoshikawa, Himeji (JP); Atsushi Fukumoto, Akashi (JP); Takuji Nakane, Himeji (JP)

(73) Assignees: ICT Co., Ltd, Osaka (JP); International Catalyst Technology, Inc., Auburn Hills, MI (US)

( * ) Notice: Subject to any disclaimer, the term of this patent is extended or adjusted under 35 U.S.C. 154(b) by 0 days.

(21) Appl. No.: 10/838,518

(22) Filed: May 4, 2004

(65) Prior Publication Data

US 2004/0224837 A1 Nov. 11, 2004

(30) Foreign Application Priority Data

May 6, 2003 (JP) ............................ 2003-127910

(51) Int. Cl.
*B01J 29/06* (2006.01)

(52) U.S. Cl. ............................ 502/64; 502/66; 502/74; 502/65; 502/73

(58) Field of Classification Search .................. 502/64, 502/66, 74, 65, 73
See application file for complete search history.

(56) References Cited

U.S. PATENT DOCUMENTS 5,292,991 A * 3/1994 Lachman et al. ............ 585/850
5,928,981 A 7/1999 Leyrer et al. .................. 502/64
5,943,857 A 8/1999 Ansell et al. .................. 60/274
6,165,430 A * 12/2000 Kudla et al. .............. 423/213.5
6,274,107 B1 8/2001 Yavuz et al. ............. 423/213.5
2001/0043896 A1 11/2001 Domesle et al. .......... 423/213.5
2002/0013228 A1* 1/2002 Matsumoto et al. ......... 502/325
2002/0086793 A1 7/2002 Labarge et al. ................ 502/67
2003/0040425 A1* 2/2003 Huang et al. .................. 502/64
2003/0125194 A1* 7/2003 Abe et al. ..................... 502/66
2004/0166036 A1* 8/2004 Chen et al. .................. 422/180

FOREIGN PATENT DOCUMENTS

| | | |
|---|---|---|
| EP | 0 714 692 | 6/1996 |
| EP | 0 935 055 A2 | 8/1999 |
| EP | 1 287 886 A1 | 3/2003 |
| JP | 7-24260 | 1/1995 |
| JP | 10-33986 | 2/1998 |
| JP | A-10-202105 | 8/1998 |
| JP | A-11-276907 | 10/1999 |
| WO | WO 03/024589 | 3/2003 |

* cited by examiner

*Primary Examiner*—Elizabeth D Wood
(74) *Attorney, Agent, or Firm*—Occhiuti Rohlicek & Tsao LLP

(57) ABSTRACT

A catalyst which purges a diesel engine exhaust gas of HC, CO, and SOF and reduces the emission of particulates as well and a method for the production thereof are provided. The catalyst for purifying a diesel engine exhaust gas has deposited on a refractory three-dimensional structure a catalyst component comprising silica-alumina supporting at least one noble metal selected from the group consisting of platinum, palladium, and rhodium and zeolite. This catalyst is produced by adding a noble metal component into a slurry of silica-alumina thereby inducing chemical adsorption, then adding zeolite to the resultant mixture thereby obtaining a mixed slurry of a noble metal-supporting silica-alumina and zeolite, dipping a refractory three-dimensional structure in the slurry thereby inducing deposition of the catalyst component, and subsequently calcining the resultant composite.

21 Claims, 2 Drawing Sheets

CATALYST INLET TEMPERATURE
TEMPERATURE (°C)
TIME (sec)
0
50
100
150
200
250
300
350
0
200
400
600
800
1000

CATALYST FOR PURIFYING DIESEL ENGINE EXHAUST GAS AND METHOD FOR PRODUCTION THEREOF

BACKGROUND OF THE INVENTION

1. Field of the Invention

This invention relates to a catalyst for purifying diesel exhaust gas which purges a diesel engine exhaust gas of hydrocarbons (hereinafter referred to as "HC"), carbon monoxide (hereinafter referred to as "CO"), and soluble organic fractions (hereinafter referred to as "SOF") contained therein by oxidation and decreases the discharge diesel particulates and a method for the production thereof.

2. Description of the Related Art

In recent years, the particulate matters particularly in the diesel engine exhaust gas (hereinafter referred to as "PM") mainly comprise solid carbon particulates (hereinafter referred to as "SOOT"), sulfates (hereinafter referred to as "sulfates"), and liquid macromolecular hydrocarbon particulates (hereinafter referred to as "SOF") and are posing a problem regarding environmental health. The reason for this anxiety resides in the fact that since the PM has a particle diameter of not more than 1 μm, it is liable to drift in the air and enter the human body through breathing. Thus, the authorities are formulating a policy toward exacting the control imposed on the emission of the PM from the diesel engines.

Meantime, the amount of the PM emitted from the diesel engine has been appreciably diminished owing to the optimization of the operation of the diesel engine materialized by the electronic control of the fuel injection system directed toward exalting its pressure and adapting its timing. This diminution, however, hardly deserves to be rated satisfactory. Besides, the SOF in the PM contains such harmful fractions as cancerating substances. Thus, the elimination of SOF and SOOT as well has come to form an important problem.

In search of a means to remove the PM, the feasibility of a system of catalysis which seizes the PM fraction in the diesel engine exhaust gas by using a device formed by depositing a catalytic substance capable of burning the PM on such a refractory three-dimensional structure as a clogged type ceramic honeycomb, a ceramic foam, a wire mesh, a metallic foam, an open-flow type ceramic honeycomb, or a metallic honeycomb and as well removes the PM either by forcibly elevating the temperature of the engine under the exhaust gas emission conditions (gas composition and temperature) obtained under the ordinary traveling condition of the diesel engine or through control of the engine or by using such a heating means as an electric heater has been being studied.

Generally, as the catalyst for purifying the exhaust gas of the diesel engine particularly of the grade intended for use in the passenger car, (1) a catalyst manifesting high efficiency in the removal by combustion of such harmful fractions as unburned hydrocarbons (hereinafter referred to as "HC") and carbon monoxide (hereinafter referred to as "CO") besides PM, (2) a catalyst excelling in the so-called high-temperature stability, namely the ability to endure a continuous operation under a high load, and (3) a catalyst excelling in the so-called ability to resist sulfur poisoning, namely the insusceptibility to the poisoning caused by the adhesion of a sulfur oxide on the catalyst observed in the operation under a low load at a low emission gas temperature are being sought.

Various proposals have been hitherto advanced with the object of exalting the efficiency of the removal by combustion of PM, HI, and CO in the diesel engine exhaust gas. The official gazette of JP-A-HEI 7-24260, for example, discloses a catalyst having platinum and/or palladium and the oxide of at least one element selected from the group consisting of tungsten, antimony, molybdenum, nickel, vanadium, manganese, iron, bismuth, cobalt, zinc, and alkaline earth metals deposited on a refractory inorganic oxide in an amount in the range of 5-50 mass % based on the mass of the inorganic oxide.

Then, in the official gazette of JP-A-HEI 10-33986, a catalyst which possesses several kinds of zeolite mixtures having different moduli and a platinum family metal and a separate metal oxide selected from the group consisting of aluminum silicate, aluminum oxide, and titanium oxide, has the aluminum silicate contain silicate dioxide at a weight ratio in the range of 0.005-1 relative to aluminum oxide, and has the platinum family metal deposited exclusively on the separate metal oxid is disclosed.

The temperature of the engine exhaust gas tends to fall under the influence such as of the EGR which is mounted on the engine for the purpose of decreasing the NOx in the engine exhaust gas. The change of the control test mode to the cold start condition with a view to approximating it to the actual working environment of the car is also spurring the decrease of the exhaust gas temperature. Under these situations, the conventional catalysts mentioned above are still deficient in the ability invariably in the low-temperature regions of PM, HC, and CO, though they are appreciably capable of combustion. During the operation at a low exhaust gas temperature, they are susceptible of the poisoning caused by the deposition of sulfur oxide on the catalyst and therefore are at a disadvantage in suffering the efficiency of combustion of PM, HC, and CO to decline.

This invention has been initiated in appreciation of this true status of affairs and has an object thereof the creation of a catalyst of the quality defined in (1)-(3) mentioned above for the purification of a diesel engine exhaust gas, which catalyst possesses satisfactorily the properties particularly required of a catalyst for use on the passenger car.

SUMMARY OF THE INVENTION

The present inventors have made a diligent study with a view to accomplishing the object mentioned above and have consequently found that the object is accomplished by depositing on a refractory three-dimensional structure a catalytic component comprising silica-alumina and zeolite and supporting thereon at least one noble metal selected from the group consisting of platinum, palladium, and rhodium. This invention has been perfected on the basis of this knowledge.

Specifically, this invention concerns a catalyst for purifying a diesel engine exhaust gas, characterized by having deposited on a refractory three-dimensional structure a catalytic component comprising silica-alumina and zeolite and supporting thereon at least one noble metal selected from the group consisting of platinum, palladium, and rhodium.

This invention further concerns a method for the production of a catalyst for purifying a diesel engine exhaust gas, characterized by adding a noble metal component into a slurry of silica-alumina, subjecting them to chemical adsorption, then adding zeolite thereto, dipping a refractory three-dimensional structure in the resultant mixed slurry of a noble metal-supporting silica-alumina and zeolite thereby inducing adhesion of a catalytic component, and subsequently calcining the resultant composite.

The catalyst for purifying a diesel engine exhaust gas according to this invention possesses such a configuration as mentioned above and, therefore, manifests a high efficiency in the removal by combustion of such harmful fractions as unburned hydrocarbons and carbon monoxide besides PM from a low temperature upward, excels in the ability to resist high temperatures, and excels in the ability to withstand sulfur poisoning.

DESCRIPTION OF THE PREFERRED EMBODIMENT

Figure 1:
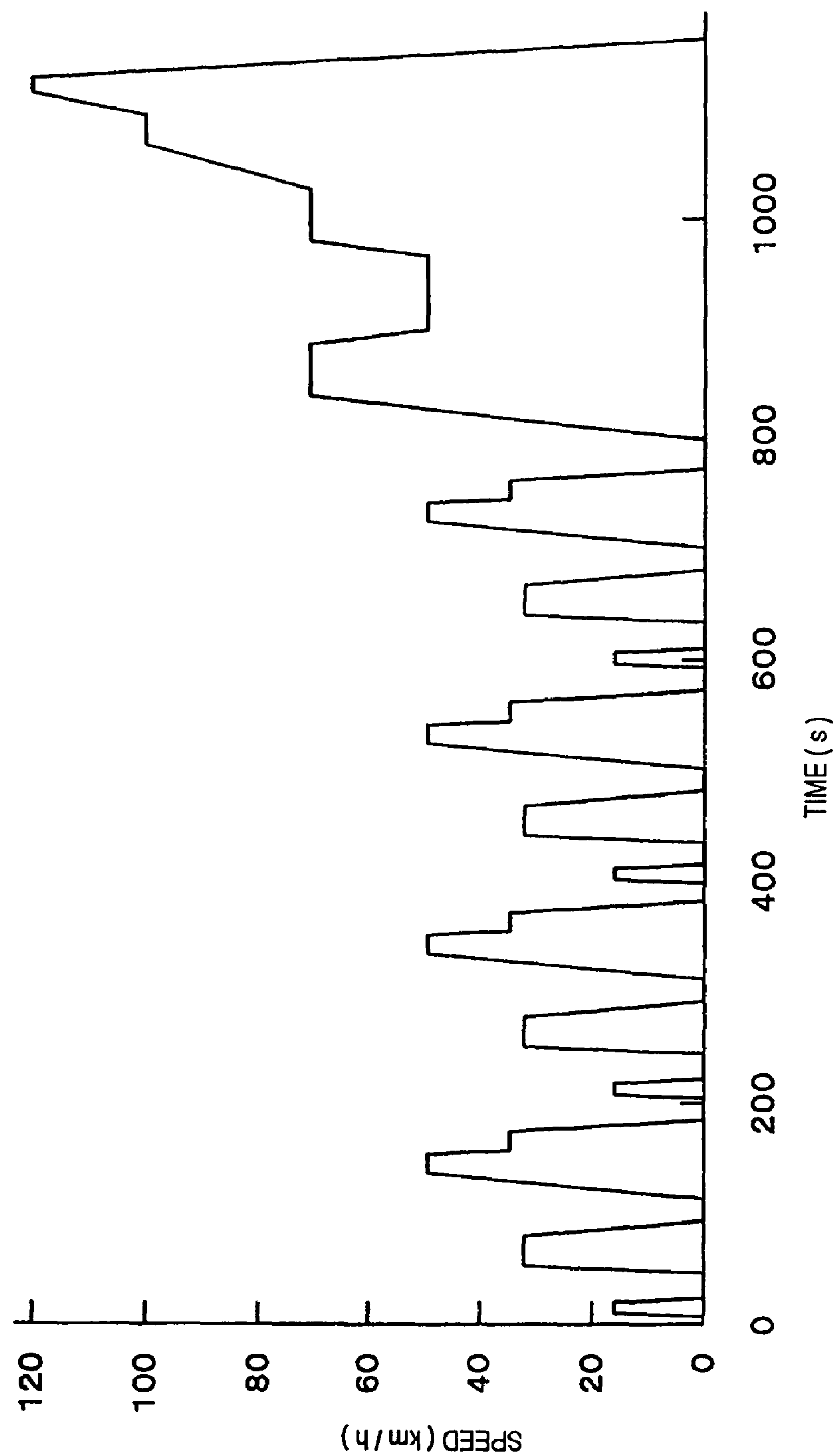
FIG. 1 is a graph showing the relation between the engine speed and the magnitude of torque on the simulation of a travel in the European emission test mode cycle and FIG. 2 is a graph showing the relation between the catalyst inlet temperature of the exhaust gas emitted from an engine and the time.

Now, this invention will be described in detail below.

This invention is characterized by combining a composite having at least one noble metal selected from the group consisting of platinum, palladium, and rhodium supported on silica-alumina and zeolite and thereby enabled to manifest such effects as purging an exhaust gas of such harmful fractions as unburned hydrocarbons, carbon monoxide, and SOF in the PM from a low temperature onward, withstanding a high-temperature continuous operation, excelling in the ability to resist high temperatures, defying the poisoning caused by such adhesion of sulfur oxide onto a catalyst as observed during the operation of the engine at a low exhaust gas temperature, and excelling in the ability to resist the sulfur poisoning.

When alumina is used, for example, as a basis for supporting a noble metal, the catalyst consequently formed indeed produces a discernible effect in purging a diesel engine exhaust gas of such harmful fractions as unburned hydrocarbons, carbon monoxide, and SOF in the PM. When this catalyst is exposed for a long time to an operation proceeding at a low exhaust gas temperature, however, it is poisoned by sulfur to a point where the ability thereof to oxidize such harmful fractions as unburned hydrocarbons, carbon monoxide, and SOF in the PM is seriously degraded because the $SO_2$ contained in the exhaust gas is oxidized by the noble metal and disposed to succumb to adsorption. In the case of silica, particularly when the catalyst is exposed for a long time to an operation proceeding at a high exhaust gas temperature, the ability of the catalyst to oxidize such harmful fractions as unburned hydrocarbons, carbon monoxide, and SOF in the PM is conspicuously degraded.

The physical properties of silica-alumina which is used as a basis for deposition in this invention do not need to be particularly restricted. For application to the actual diesel car, the silica-alumina advisably possesses a specific surface area (Brunaer-Emmett-Teller {BET} specific surface area) in the range of 100-400 $m^2/g$, preferably 120-350 $m^2/g$. If the silica-alumna used has a specific surface area which falls short of 100 $m^2/g$, the shortage will result in degrading the ability thereof to disperse platinum, palladium, and rhodium and impairing the ability of the catalyst to oxidize such harmful fractions as unburned hydrocarbons, carbon monoxide, and SOF in the PM. Conversely, if the silica-alumina used has a specific surface area exceeding 400 $m^2/g$, it no longer deserves to be rated as thermally stable, succumbs to thermal change in the diesel emission gas, and incurs a great impairment of the ability to oxidize such harmful fractions as unburned hydrocarbons, carbon monoxide, and SOF in the PM. Since this excess further results in increasing the amount of deposition of the $SO_2$ in the exhaust gas and consequently degrading the ability of the catalyst to resist the poisoning of sulfur.

The mass ratio of $SiO_2$ to $Al_2O_3$ in the silica-alumina commendably falls in the range of 0.02-1, preferably in the range of 0.05-0.5. If the mass ratio of $SiO_2$ to $Al_2O_3$ falls short of 0.02, the shortage will result in decreasing the superiority of the composite, silica-alumina, to alumina used singly, disposing the $SO_2$ to succumb easily to adsorption, and consequently degrading the ability to oxidize such harmful fractions as unburned hydrocarbons, carbon monoxide, and SOF in the PM. Conversely, if the mass ratio of $SiO_2$ to $Al_2O_3$ exceeds 1, the excess will result in degrading the ability of the catalyst to oxidize such harmful fractions as unburned hydrocarbons, carbon monoxide, and SOF in the PM when the catalyst is exposed for a long time to an operation proceeding at a high exhaust gas temperature.

The silica-alumina mentioned above is preferably used in a powdery form. The average particle diameter of the powder is in the range of 5-90 μm, preferably 10-45 μm.

The role of the zeolite in the catalyst of this invention consists in endowing the catalyst with a function of adsorbing unburned hydrocarbons under the condition of a low emission gas temperature at which the catalyst is not activated and desorbing them after the emission gas temperature has risen. Most of the desorbed hydrocarbons are burned on the catalyst which has been activated by the elevation of the temperature. That is, the zeolite has the role of widening the range of temperature in which the unburned hydrocarbons in the exhaust gas can be adsorbed and removed by combustion. Further, the zeolite functions to exalt the ability of the catalyst to resist the poisoning of sulfur because the acidic quality possessed by the zeolite is effective in repressing the adsorption to the catalyst of the SO2 contained in the exhaust gas. Of all the types of zeolite, the most suitable for the addition to the catalyst contemplated by this invention is beta zeolite.

When the addition of zeolite is omitted, the absence entails a decrease of the ability of the catalyst to oxidize unburned hydrocarbons particularly in a range of low temperature and a decrease of the ability of the catalyst to resist the poisoning of sulfur as well. When zeolite of a kind other than beta zeolite such as, for example, ZSM-5or mordenite is used, the function of adsorbing long-chain hydrocarbons present in the diesel engine exhaust gas is lower than beta zeolite and the effect of decreasing hydrocarbons is decreased, though the function of adsorbing hydrocarbons is discernible.

The mass ratio of $SiO_2$ to $Al_2O_3$ in the zeolite is in the range of 10-150, preferably 18-50. If this mass ratio exceeds 150, the excess will result in lowering the acid point of zeolite and decreasing the effect of decreasing hydrocarbons particularly in a range of low temperature. Conversely, if the mass ratio falls short of 10, the shortage will result in depriving the structure of zeolite of thermal stability and suffering it to succumb to a thermal change in the diesel engine exhaust gas and entailing a decrease in the function of adsorbing hydrocarbons.

The silica-alumina and the zeolite which support at least one noble metal selected from the group consisting of platinum, palladium, and rhodium as described above each possess the functions mentioned above. Only when they are combined, the catalyst consequently obtained is enabled to acquire fully satisfactorily the properties which are required of the catalysts of (1)-(3) for purifying a diesel engine exhaust gas, particularly the catalyst for use in a passenger car.

The catalyst contemplated by this invention is produced by depositing on a refractory three-dimensional structure a catalyst component which comprises silica-alumina supporting at least one noble metal selected from the group consisting of platinum, palladium, and rhodium, preferably platinum and zeolite, preferably beta zeolite.

The raw material for the noble metal mentioned above does not need to be particularly restricted. For example, nitrates, acetates, chlorides, sulfates, oxides, peroxides, and hydroxides are available. To cite some examples, platinum chloride, aqueous platinum nitrate solution, and aqueous dinitrodiammine platinum (II) nitrate solution are starting raw materials for platinum, aqueous palladium nitrate solution is a starting raw material for palladium, and aqueous rhodium nitrate solution is a starting raw material for rhodium, for example.

Various methods are available for the production of such a noble metal. For example, a noble metal component mentioned above is added to a slurry of silica-alumina and they are stirred. During this stirring, they are optionally heated to promote the reaction of the noble metal component and the silica-alumina. The temperature reached by this heating is in the range of 15° -500° C., preferably in the range of 25° -150° C. Consequently, the noble metal component is chemically adsorbed by the silica-alumina.

Then, the slurry of the silica-alumina which has chemically adsorbed the noble metal is optionally dried by heating. The dry or slurry and zeolite of a prescribed amount are added together and subsequently subjected to dry pulverization or wet pulverization. When the resultant powder is a product of wet pulverization, it is directly slurried. When it is a product of dry pulverization, it is slurried in the presence of water. The refractory three-dimensional structure is dipped in the slurry to induce deposition of the catalyst component on the structure.

Next, a gas such as air is passed through the individual cells of the three-dimensional structure to expel surplus catalyst component. The structure is further dried and then calcined.

The calcination atmosphere for the catalyst may be properly selected from among a body of air, a body of vacuum, a current of such an inert gas as nitrogen, or a current of such a reducing gas as hydrogen or carbon monoxide to suit the method adopted for the preparation of the catalyst. The calcination with a reducing gas proves particularly advantageous. The calcination temperature falls preferably in the range of 200° -800° C. and more preferably in the range of 300° -600° C. Then, the calcination time falls preferably in the range of 30 minutes -20 hours and more preferably in the range of one 1-5 hours.

By adding the noble metal component into the silica-alumina slurry and stirring and mixing them together as described above, it is made possible to deposit the noble metal component on the silica-alumina by chemical adsorption.

Meanwhile, even when the zeolite and the silica-alumina are mixed, substantially no deposition occurs on the zeolite.

The aforementioned catalyst component in this invention may optionally contain at least one element selected from the group consisting of titanium, zirconium, and rare earth elements for the purpose of improving the ability to endure high temperatures and the ability to resist sulfur poisoning and exalting the oxidizing property. The mass ratio of the element mentioned above to the total amount of the catalyst deposited falls properly in the range of 1-50 parts by mass and preferably in the range of 3-20 parts by mass based on 100 parts by mass of the total amount of deposition.

The mass ratio of silica-alumina to zeolite in the catalyst of this invention is properly in the range of 0.5-5 and preferably in the range of 0.8-3. If the mass ratio of silica-alumina to zeolite falls short of 0.5, the shortage will result in unduly increasing the amount of adsorption of hydrocarbons, consequently increasing the amount of hydrocarbon to be desorbed, preventing the combustion on the catalyst from proceeding fully proportionately, and impairing the balance among the component processes. If the ability to adsorb hydrocarbons is unduly exalted, the excess will possibly result in clogging the catalyst because of the blockage of the cells. Conversely, if the mass ratio of silica-alumina to zeolite exceeds 5, the excess will result in lowering the ability of the catalyst to adsorb hydrocarbons and consequently reducing the effect of decreasing hydrocarbons in the range of low temperatures. It will also degrade the effect of repressing the adsorption of $SO_2$ but the catalyst and lowering the ability to resist the poisoning of sulfur.

The amount of at least one element selected from the group consisting of platinum, palladium, and rhodium in the catalyst of this invention and supported by the catalyst per liter (hereinafter denoted by L) of the refractory three-dimensional structure is properly in the range of 0.01-5 g/L and particularly in the range of 0.5-4 g/L.

The refractory three-dimensional structure to be used in this invention has only to be what is generally called a "ceramic honeycomb substrate." Particularly, honeycomb substrates using such materials as cordierite, mullite, α-alumina, zirconia, titania, titanium phosphae, aluminum titanate, bellite, spodumene, aluminosilicate, and magnesium silicate are preferred examples. Among other honeycomb substrates enumerated above, those made of cordierite prove particularly favorable. Besides, substrates which are formed of such oxidation-resistant refractory metals as stainless steel and FeCr—Al alloys in a solid construction are usable.

These monolithic substrates are produced by a method of extrusion molding or a method of forming a solid construction by tightly rolling a sheetlike material. The gas-passing mouths (shape of cells) of such a honeycomb construction may assume any of various forms such as hexagon, tetragon, triangle, and corrugation. The cell density (number of cells/unit cross section) which falls in the range of 150-900 cells/square inch, preferably 400-600 cells/square inch, suffices for the honeycomb substrate to prove fully useful.

In the use of the catalyst of this invention for purifying a diesel engine exhaust gas, the space velocity of the exhaust gas falls preferably in the range of 5,000-200,000 $hr^{-1}$. If the space velocity of the gas falls short of 5,000 $hr^{-}$, the shortage will result in requiring the necessary catalyst capacity to increase unduly at a sacrifice of economy. If it exceeds 200,000$hr^{-}$, the excess will result in degrading the efficiency of purification of the diesel engine exhaust gas. The temperature of the exhaust gas at the inlet to the catalyst bed during the use of the catalyst of this invention for purifying the diesel engine exhaust gas falls properly in the range of 200° C.-700° C., preferably in the range of 250° C.-600° C. If this temperature falls short of 200° C. or exceeds 700° C., the deviation will result in degrading the ability to purify the diesel engine exhaust gas below the target value.

Varying embodiments of the catalyst of this invention for purifying the diesel engine exhaust gas will be described below with reference to the relevant methods of production of the catalysts.

EXAMPLE 1

A platinum-supporting silica-alumina powder (hereinafter referred to as "platinum powder A") was obtained by adding and mixing 1800 g of a silica-alumina (hereinafter referred to as "silica-alumina A") having a BET specific surface area of 320 $m^2/g$ and containing silica at a mass ratio of 0.053 relative to alumina and an aqueous dinitrodiammine platinum (II) nitrate solution containing 60 g of platinum together and drying the resultant mixture and calcining it at a temperature of 500° C. for one hour. A slurry was obtained by adding the platinum powder A, 2400 g of beta zeolite ($SiO_2/Al_2O_3$=25) (which ratio holds good hereinafter) and an aqueous medium and wet pulverizing the resultant mixture. Then, a complete catalyst was obtained by dipping a cordierite honeycomb substrate (which holds good hereinafter) in the slurry, blowing the wet honeycomb substrate consequently obtained to expel the surplus slurry, drying it at 150° C., and subsequently calcining it at 500° C. for one hour. This catalyst was coated with 2.0 g of platinum per liter of honeycomb, 60 g of silica-lumina per liter of honeycomb, and 80 g of beta-zeolite per liter of honeycomb.

The honeycomb substrate was formed of cordierite measuring 1.3 liter in volume, containing 400 cells per square inch of cross section, and having a wall thickness of 6 mils.

Control 1

A complete catalyst was obtained by following the procedure of Example 1 while using silica-alumina A in the place of beta-zeolite during the course of wet pulverization. This catalyst was coated with 2.0 g of platinum per liter of honeycomb and 140 g of silica-alumina per liter of honeycomb.

EXAMPLE 2

A complete catalyst was obtained by following the procedure of Control 1 while adding 1200 g of beta-zeolite and 1200 g of silica-alumina A instead of solely adding beta zeolite during the course of wet pulverization. This catalyst was coated with 2.0 g of platinum per liter of honeycomb, 100 g of silica-alumina per liter of honeycomb, and 40 g of beta zeolite per liter of honeycomb.

EXAMPLE 3

A complete catalyst was obtained y following the procedure of Control 1 while adding 2100 g of beta-zeolite and 300 g of titania instead of solely adding beta zeolite during the course of wet pulverization. This catalyst was coated with 2.0 g of platinum per liter of honeycomb, 60 g of silica-alumina per liter of honeycomb, 70 g of beta zeolite per liter of honeycomb, and 10 g of titania per liter of honeycomb.

EXAMPLE 4

A complete catalyst was obtained by following the procedure of Example 1 while using silica-alumina (hereinafter referred to as "silica-alumina B") having a specific surface area of 150 $m^2/g$ and containing silica in a weight ratio of 0.05 relative to alumina in the place of silica-alumina A. This catalyst was coated with 2.0 g of platinum per liter of honey comb, 60 of silica-alumina per liter of honeycomb, and 80 g of beta zeolite per liter of honeycomb.

EXAMPLE 5

A complete catalyst was obtained by following the procedure of Example 4 while adding 900 g of silica-alumina B, 300 g of zirconia, and 1200 g of betal-zeolite instead of solely adding beta zeolite during the course of wet pulverization. This catalyst was coated with 2.0 g of platinum per liter of honeycomb, 90 g of silica-alumina per liter of honeycomb, 40 g of beta zeolite per liter of honeycomb, and 10 g of zirconia per liter of honeycomb.

Control 2

A complete catalyst was obtained by following the procedure of Example 1 while using ZSM5 zeolite in the place of beta-zeolite during the course of wet pulverization. This catalyst was coated with 2.0 g of platinum per liter of honeycomb, 60 g of silica-alumina per liter of honeycomb, and 80 g of ZSM5 zeolite per liter of honeycomb.

Control 3

A platinum-supporting powder was obtained by following the procedure of Example 1 while using beta-zeolite in the place of silica-alumina during the deposition of platinum powder. A complete catalyst was obtained by following the procedure of example 1 while using silica-alumina A in the place of beta zeolite during the course of wet pulverization. This catalyst was coated with 2.0 g of platinum per liter of honeycomb, 60 g of beta zeolite per liter of honeycomb, and 80 g of silica-alumina per liter of honeycomb.

EXAMPLE 10

The catalysts obtained in the preceding examples and controls were tested for ability to purify an exhaust gas according to the following methods of testing.

(Apparatus and Fuel Used)

A commercially available additional supply direct injection type diesel engine (4 cylinders, 2500 cc) connected to a dynamo meter was used. An automatic operation control device capable of automatically adjusting engine speed and torque was connected to the dynamo meter. As the fuel for evaluation, light oil having a sulfur content of less than 0.05 mass % was used. In the test for the ability to endure sulfur poisoning, light oil having a sulfur content of 0.20 mass % was used.

(Method for Determining Ability to Endure Sulfur Poisoning)

The engine operated by using the aforementioned light oil having a higher sulfur content was exposed for 50 hours to the exhaust gas, with the torque adjusted to change the engine speed of the engine from 1400 to 2200 r.p.m. and the catalyst inlet temperature from 200° to 300° C.

(Method for Determining Ability to Endure High Temperatures)

The engine operated by using the same fuel as in the evaluation was exposed for 20 hours to the exhaust gas, with the engine speed and the torque of the engine adjusted to set the catalyst inlet temperature at 600° C.

(Mode of Evaluation)

Figure 2:
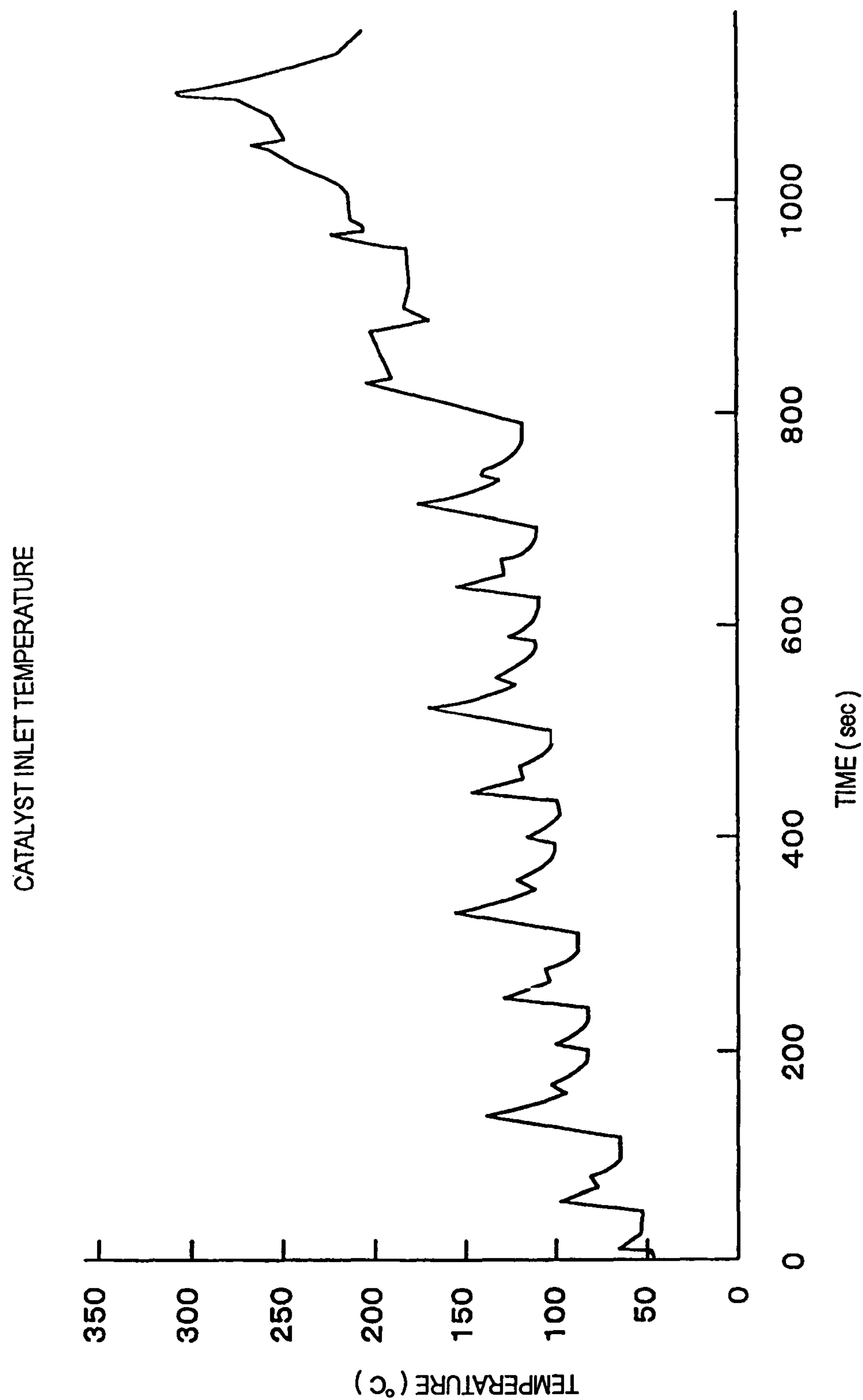

The catalyst inlet temperature of the exhaust gas emitted from the engine was varied as shown in FIG. 2 by arbitrarily changing the engine speed and the torque of the engine on the assumption of a travel in the European emission gas control mode as shown in FIG. 1.

(Method of Evaluation)

A part of the exhaust gas which had not been passed through the catalyst bed was analyzed with an exhaust gas analyzing meter. Another part of the exhaust gas which had been passed through the catalyst bed was sampled and tested for ratio of purgation of HC, CO, and PM. The ratios of purgation reported herein were invariably averages of the data obtained by the evaluation mode mentioned above. The results are shown in Tables 1-3.

TABLE 1

| | Type of catalyst | Mass ratio of $SiO_2$—$Al_2O_3$/ BEA | Initial ratio of purgation (%) HC | CO | PM |
|---|---|---|---|---|---|
| Example 1 | Pt/$SiO_2$—$Al_2O_3$ + BEA | 0.750 | 80 | 92 | 50 |
| Example 2 | Pt/$SiO_2$—$Al_2O_3$ + BEA + $SiO_2$—$Al_2O_3$ | 2.50 | 75 | 93 | 48 |
| Example 3 | Pt/$SiO_2$—$Al_2O_3$ + BEA + $TiO_2$ | 0.857 | 78 | 90 | 52 |
| Example 4 | Pt/$SiO_2$—$Al_2O_3$ + BEA | 0.750 | 74 | 89 | 53 |
| Example 5 | Pt/$SiO_2$—$Al_2O_3$ + BEA + $ZrO_2$ + $SiO_2$—$Al_2O_3$ | 2.25 | 76 | 97 | 50 |
| Control 1 | Pt/$SiO_2$—$Al_2O_3$ | — | 59 | 92 | 50 |
| Control 2 | Pt/$SiO_2$—$Al_2O_3$ + MFI | — | 69 | 89 | 52 |
| Control 3 | Pt/BEA + $SiO_2$—$Al_2O_3$ | 1.33 | 70 | 88 | 48 |

TABLE 2

| | Type of catalyst | Mass ratio of $SiO_2$—$Al_2O_3$/ BEA | Ratio of purgation (%) after enduring sulfur poisoning HC | CO | PM |
|---|---|---|---|---|---|
| Example 1 | Pt/$SiO_2$—$Al_2O_3$ + BEA | 0.750 | 63 | 60 | 35 |
| Example 2 | Pt/$SiO_2$—$Al_2O_3$ + BEA + $SiO_2$—$Al_2O_3$ | 2.50 | 59 | 61 | 32 |
| Example 3 | Pt/$SiO_2$—$Al_2O_3$ + BEA + $TiO_2$ | 0.857 | 65 | 58 | 34 |
| Example 4 | Pt/$SiO_2$—$Al_2O_3$ + BEA | 0.750 | 62 | 65 | 36 |
| Example 5 | Pt/$SiO_2$—$Al_2O_3$ + BEA + $ZrO_2$ + $SiO_2$—$Al_2O_3$ | 2.25 | 58 | 63 | 37 |
| Control 1 | Pt/$SiO_2$—$Al_2O_3$ | — | 20 | 37 | 20 |
| Control 2 | Pt/$SiO_2$—$Al_2O_3$ + MFI | — | 49 | 60 | 30 |
| Control 3 | PT/BEA + $SiO_2$—$Al_2O_3$ | 1.33 | 35 | 40 | 25 |

TABLE 3

| | Type of catalyst | Mass ratio of $SiO_2$—$Al_2O_3$/ BEA | Ratio of purgation (%) after enduring high temperatures HC | CO | PM |
|---|---|---|---|---|---|
| Example 1 | Pt/$SiO_2$—$Al_2O_3$ + BEA | 0.750 | 70 | 75 | 45 |
| Example 2 | Pt/$SiO_2$—$Al_2O_3$ + BEA + $SiO_2$—$Al_2O_3$ | 2.50 | 68 | 78 | 44 |
| Example 3 | Pt/$SiO_2$—$Al_2O_3$ + BEA + $TiO_2$ | 0.857 | 70 | 80 | 48 |
| Example 4 | Pt/$SiO_2$—$Al_2O_3$ + BEA | 0.750 | 65 | 79 | 46 |
| Example 5 | Pt/$SiO_2$—$Al_2O_3$ + BEA + $ZrO_2$ + $SiO_2$—$Al_2O_3$ | 2.25 | 63 | 85 | 50 |
| Control 1 | Pt/$SiO_2$—$Al_2O_3$ | — | 25 | 40 | 25 |
| Control 2 | Pt/$SiO_2$—$Al_2O_3$ + MFI | — | 50 | 58 | 23 |
| Control 3 | Pt/BEA + $SiO_2$—$Al_2O_3$ | 1.33 | 35 | 45 | 18 |

The entire disclosure of Japanese Patent Application No. 2003-127910 filed on May 6, 2003 including specification, claims, drawings, and summary are incorporated herein by reference in its entirety.

What is claimed is:

1. A catalyst for purifying a diesel engine exhaust gas, formed by depositing on a refractory three-dimensional structure a catalyst component comprising silica-alumina having an average particle diameter of 10-45 μm, at least one noble metal selected from the group consisting of platinum, palladium, and rhodium, and beta zeolite, wherein the at least one noble metal is supported on the silica-alumina, but not on the beta zeolite.

2. A catalyst according to claim 1, wherein the mass ratio of silica/alumina in said silica-alumina is in the range of 0.02-1.

3. A catalyst according to claim 1, wherein the mass ratio of silica/alumina in said beta zeolite is in the range of 10-150.

4. A catalyst according to claim 1, wherein said silica-alumina has a BET specific surface area in the range of 100-400 $m^2/g$ and the mass ratio of $SiO_2$ to $Al_2O_3$ is in the ratio of 0.02-1.

5. A catalyst according to claim 1, wherein said silica-alumina is in a powdery form.

6. A catalyst according to claim 1, wherein the mass ratio of silica-alumina to zeolite is in the range of 0.5-5.

7. A catalyst according to claim 1, wherein the amount of said at least one noble metal is in the range of 0.01-5 g per liter of the volume of the catalyst.

8. A catalyst according to claim 1, wherein said catalyst component further contains at least one element selected from the group consisting of titanium, zirconium, and rare earth elements.

9. A method for the production of a catalyst for purifying a diesel engine exhaust gas, characterized by adding a noble metal component into a slurry of silica-alumina having an average particle diameter of 10-45 μm, thereby inducing chemical adsorption, adding beta zeolite to the resultant mixture thereby obtaining a mixed slurry, dipping a refractory three-dimensional structure in said mixed slurry thereby inducing deposition of a catalyst component, and calcining the composite consequently obtained.

10. A method according to claim 9, wherein the mass ration of silica/alumina in said silica-alumina is in the range of 0.02-1.

11. A method according to claim 9, wherein the mass ratio of silica/alumina in said beta zeolite is in the range of 10-150.

12. A method according to claim 9, wherein said silica/alumina has a BET specific surface area in the range of 100-400 $m^2/g$ and the mass ratio of $SiO_2$ to $Al_2O_3$ is in the ratio of 0.02-1.

13. A method according to claim 9, wherein said silica-alumina is in a powdery form.

14. A method according to claim 9, wherein the mass ratio of silica-alumina to zeolite is in the range of 0.5-5.

15. A method according to claim 9, wherein the amount of said noble metal is in the range of 0.01-5 g per liter of the volume of the catalyst.

16. A method according to claim 9, wherein said catalyst component further contains at least one element selected from the group consisting of titanium zirconium, and rare earth elements.

17. A method according to claim 9, wherein the addition of the noble metal component into the slurry of silica-alumina is carried out at the temperature of 15-500° C.

18. The catalyst according to claim 1, wherein the mass ratio of the silica-alumina and the beta zeolite is in the range of 0.8-3.

19. The method according to claim 9, wherein the mass ratio of the silica-alumina and the beta zeolite is in the range of 0.8-3.

20. The catalyst according to claim 1, wherein the mass ratio of silica and alumina in the silica-alumina is in the range of 0.05-0.5.

21. The catalyst according to claim 1, wherein the mass ratio of silica and alumina in the beta zeolite is in the range of 18-50.

* * * * *